Dec. 13, 1938.                H. T. WALKER                 2,140,437
                     BLADE SHARPENER FOR LAWN MOWERS
                          Filed Aug. 5, 1937
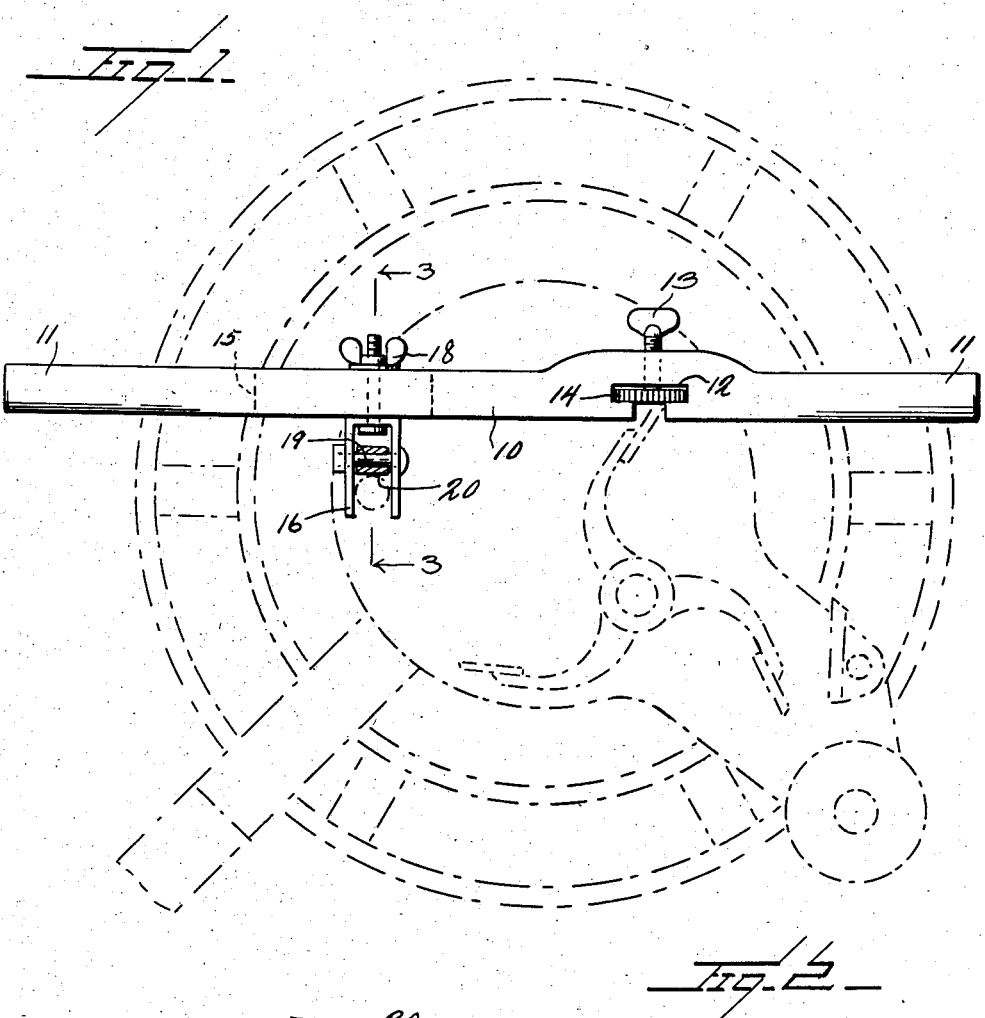
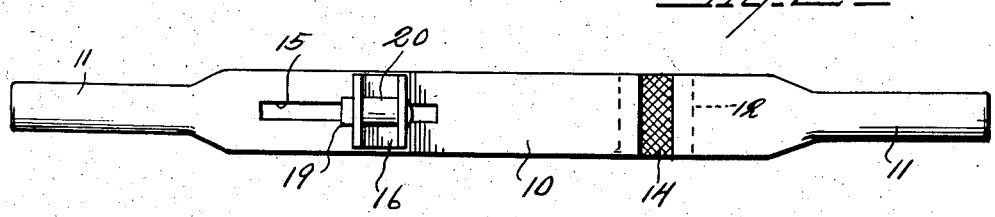
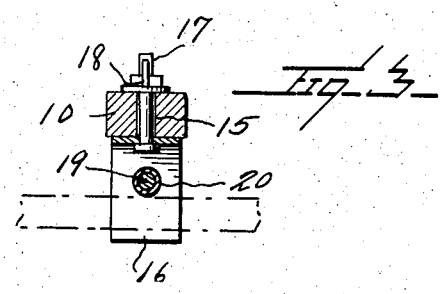
Inventor
H. T. Walker
By Watson E. Coleman
                    Attorney

UNITED STATES PATENT OFFICE 2,140,437

BLADE SHARPENER FOR LAWN MOWERS

Horace T. Walker, Columbia, Ky.

Application August 5, 1937, Serial No. 157,625

1 Claim. (Cl. 76—82.1)

This invention relates to devices for sharpening lawn mower blades and particularly to a device for this purpose which includes a handle carrying a file or like abrading element and a guide which is adapted to engage a cross-bar of the mower when the file is resting upon one of the mower blades, the device being provided with handles whereby it may be reciprocated for the length of the mower blade.

The general object of my invention is to provide a device of this character which is very simply constructed and cheaply made and which is provided with a guide which is adjustable toward or from the file holding portion of the device so as to permit the device to be used on various makes of lawn mowers.

Another object is to provide means for holding the file firmly in place which means, however, will permit this file or abrading element to be adjusted.

My invention is illustrated in the accompanying drawing wherein:—

Fig. 1 is an elevation of my blade sharpening device, the figure showing a portion of a mowing machine in dotted lines to illustrate the application of the sharpener.

Fig. 2 is an underside plan view of the sharpener.

Fig. 3 is a section on the line 3—3 of Fig. 1.

Referring to this drawing, 10 designates a bar of wood or other suitable material having a length of somewhat over a foot and being formed with handle portions 11 adjacent its ends. This bar is flat on its underface and adjacent one handle of the bar there is formed the T-shaped slot 12, which opens upon the underface of the bar. A set screw 13 extends through the bar and is adapted to bear against a small section of file or other abrading element 14. As illustrated, the abrading element is narrower than the length of the head of slot 12 but wider than the mouth of the slot. The length of the portion 12 of the slot permits flat files of different widths to be used.

Adjacent the other handle 11 there is formed a longitudinally extending slot 15 and disposed against the underface of the bar 10 is a U-shaped guide 16. A bolt 17 passes through the upper end of the guide and through the slot 15 and is engaged by a nut 18. Extending through the guide is a bolt 19 and mounted upon this bolt is a roller 20. By means of the slot 15, the guide may be adjusted nearer to or further from the abrading element 14.

In the use of this device, the guide 19 is disposed to embrace a cross-bar 21 of a mowing machine, as shown in Fig. 1, with the roller 20 resting upon this cross-bar. The edge of the blade is inserted through the mouth of slot 12 so that the abrading element bears against the beveled edge of the blade. When the bar is reciprocated longitudinally of the blade, the blade will turn so that the toothed face of the abrading element will bear against and file away the metal on the beveled face of the blade and, of course, sharpen the blade at the proper angle for cutting. By having the guide 16 adjustable toward or from the file 14, the device is adapted to be adjusted to suit any ordinary mowing machine having a revolving series of blades. Obviously in place of the file 14, a honing element may be disposed within the slot 12 and, of course, the set screw 13 will hold this honing element or the file rigidly in place.

What is claimed is:

A lawn mower sharpening device, comprising a bar having a portion of each end formed to provide a handle, the bar having a T-shaped slot cut transversely thereinto and opening through one face, said slot being designed to receive a body having a cutting face, means carried by the bar and extending into the slot for securing said body therein whereby the said cutting face may be engaged by the end of a blade extended into the slot and disposed transversely of the bar, said bar having an elongated slot formed longitudinally therethrough adjacent the handle remote from the T-slot, a substantially U-shaped member having two side portions and a flat yoke portion connecting the side portions, said yoke portion being disposed against the side of the bar through which the T-shaped slot opens and lying over said elongated slot, a pin extending across and connecting the side portions of the U-shaped member, a roller carried upon said pin, said U-shaped member being designed to receive a cross brace bar of the lawn mower and said roller being designed to rest upon said bar, a bolt extending through the aperture of the yoke of the U-member and through said slot, and means engaging said bolt to secure the U-member against the slotted bar.

HORACE T. WALKER.